(12) United States Patent
Fulop et al.

(10) Patent No.: US 8,154,186 B2
(45) Date of Patent: Apr. 10, 2012

(54) FIXING MECHANISM FOR AN INNER ASSEMBLY TO OUTER BULB

(75) Inventors: Jozsef Fulop, Budapest (HU); Peter Mora, Budapest (HU); Laszlo Petras, Budapest (HU); Peter Lucz, Budapest (HU)

(73) Assignee: General Electric Company, Schenectady, NY (US)

( * ) Notice: Subject to any disclaimer, the term of this patent is extended or adjusted under 35 U.S.C. 154(b) by 673 days.

(21) Appl. No.: 12/181,406

(22) Filed: Jul. 29, 2008

(65) Prior Publication Data

US 2010/0026162 A1  Feb. 4, 2010

(51) Int. Cl.
*H01J 5/48* (2006.01)

(52) U.S. Cl. ......... 313/318.09; 313/318.01; 313/318.03; 313/318.1; 313/623

(58) Field of Classification Search ............. 313/318.01, 313/318.03, 318.1, 623
See application file for complete search history.

(56) References Cited

U.S. PATENT DOCUMENTS

| | | | |
|---|---|---|---|
| 4,290,098 A * | 9/1981 | Pierson | 362/485 |
| 5,161,881 A * | 11/1992 | Myson | 362/249.14 |
| 2002/0000770 A1 | 1/2002 | Shibata et al. | |
| 2003/0071556 A1 | 4/2003 | Itaya et al. | |
| 2003/0080691 A1 | 5/2003 | Yasuda et al. | |
| 2004/0218385 A1 | 11/2004 | Tomiyoshi et al. | |
| 2005/0116604 A1 * | 6/2005 | Bobel | 313/318.1 |
| 2007/0063656 A1 | 3/2007 | Wursching et al. | |
| 2008/0164803 A1 * | 7/2008 | Arndt et al. | 313/318.1 |

FOREIGN PATENT DOCUMENTS

| WO | 2005099360 A | 10/2005 |
|---|---|---|
| WO | 2007123491 A | 11/2007 |

OTHER PUBLICATIONS

International Search Report issued in connection with corresponding PCT Application No. PCT/US2009/049658 on Mar. 30, 2010.

* cited by examiner

*Primary Examiner* — Nimeshkumar Patel
*Assistant Examiner* — Anthony Perry
(74) *Attorney, Agent, or Firm* — Fay Sharpe LLP

(57) ABSTRACT

A lamp assembly includes an inner assembly that has a CFL source, an electronics board, and a holder that interconnects the CFL source and electronics board. An outer, light transmissive envelope surrounds the inner assembly and various fixing arrangements are disclosed for securing the inner assembly to the outer envelope. Three primary mechanisms are a ratchet mechanism, a spring mechanism, or using adhesive to secure the inner assembly to the outer envelope under a predetermined tension.

7 Claims, 9 Drawing Sheets

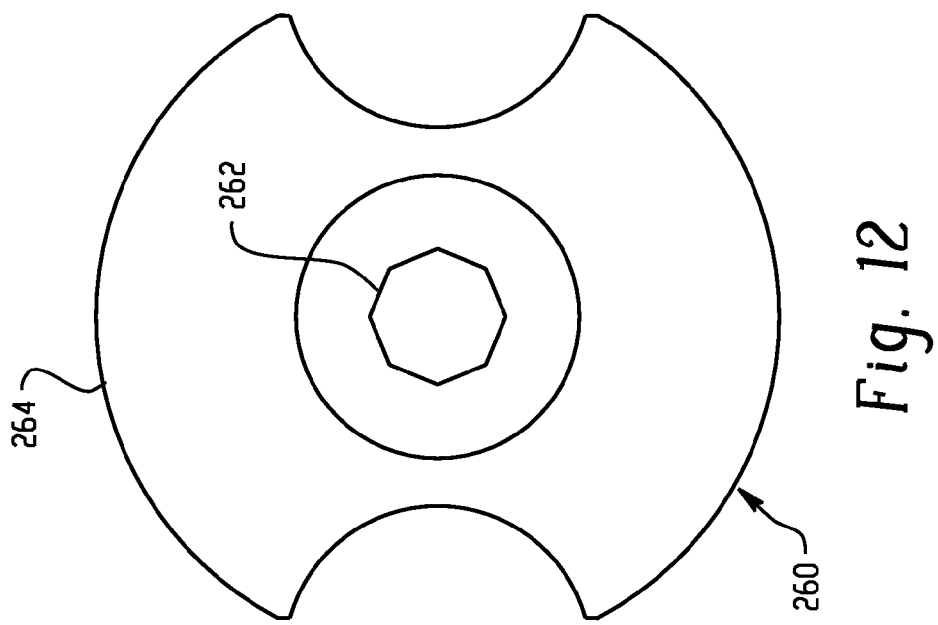
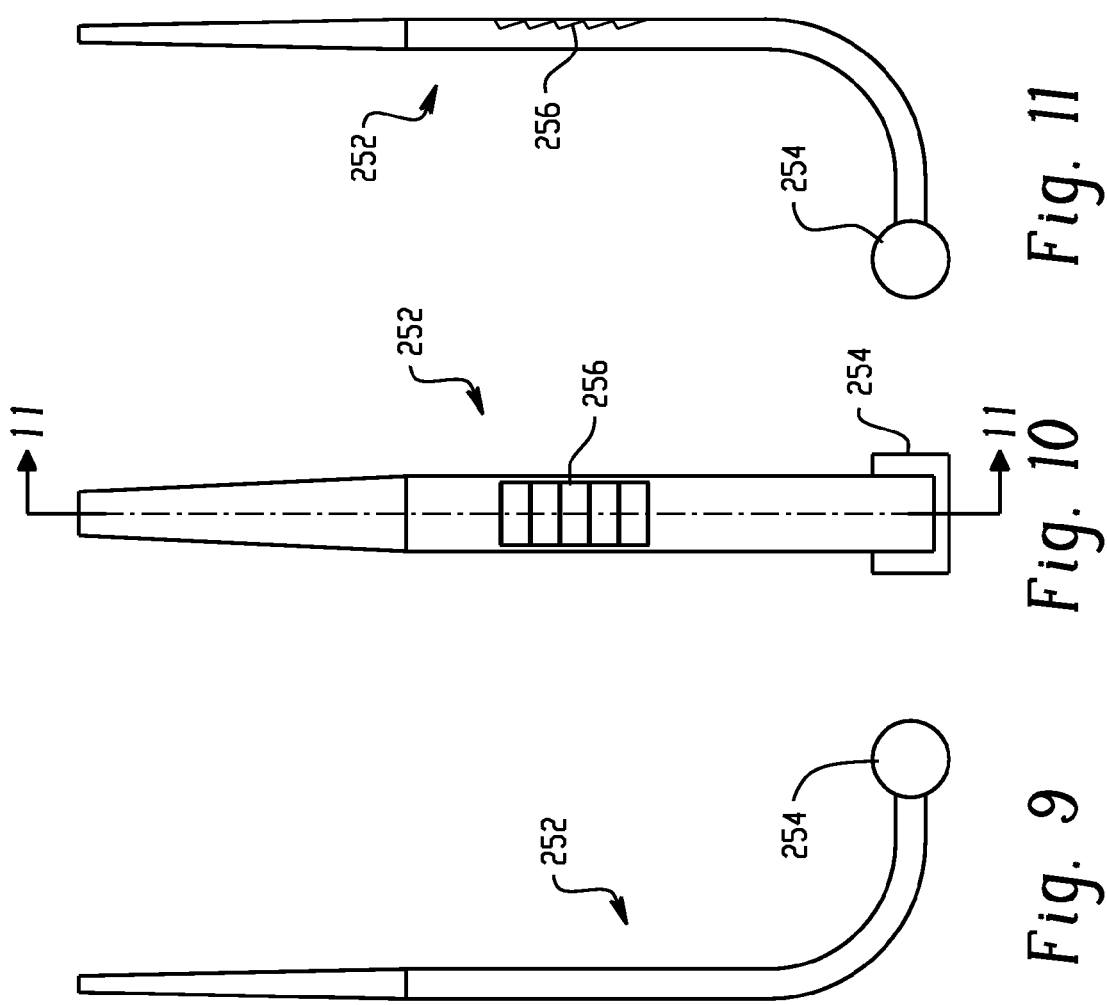

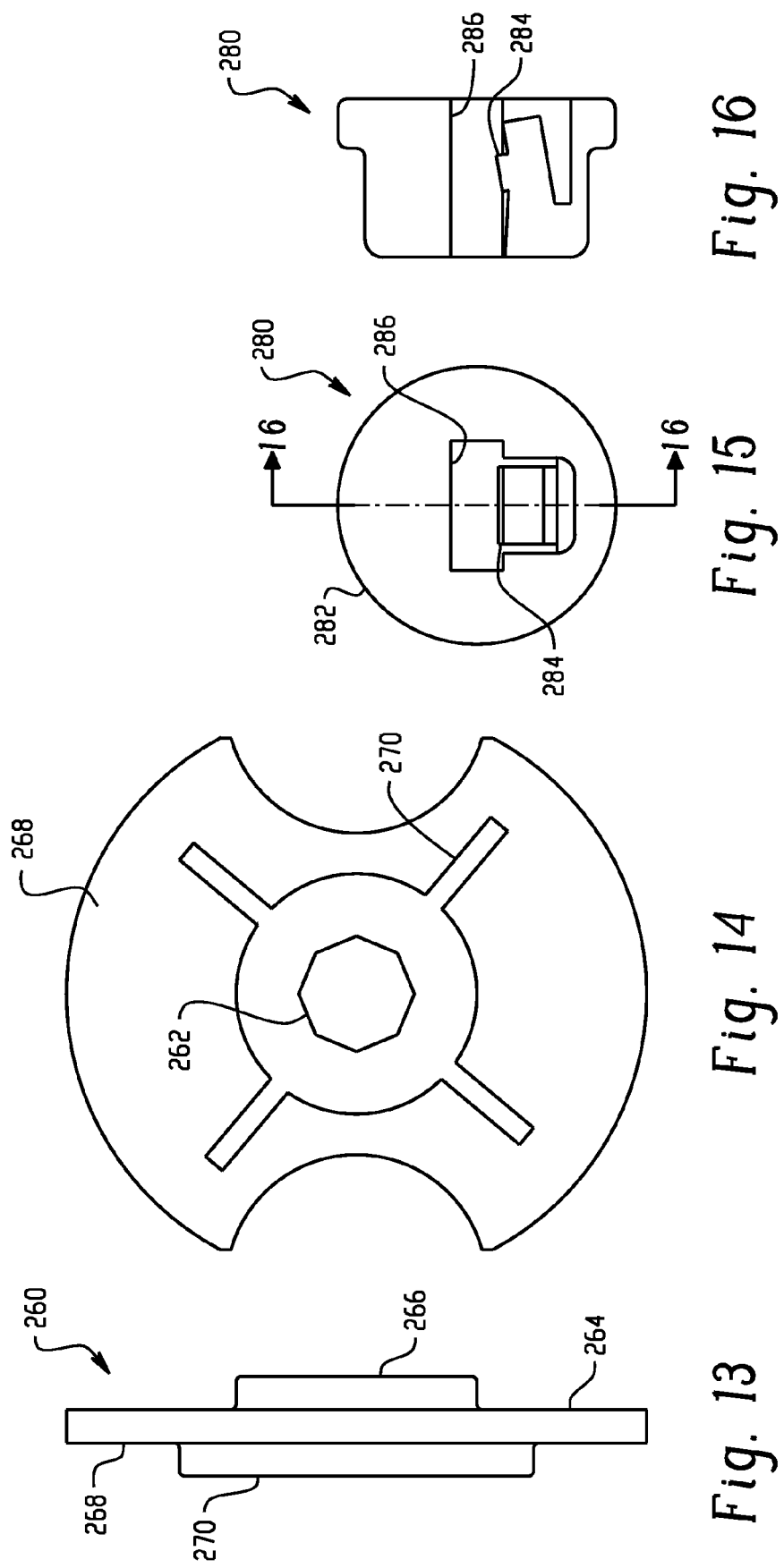

FIXING MECHANISM FOR AN INNER ASSEMBLY TO OUTER BULB

BACKGROUND OF THE DISCLOSURE

Cross-reference is made to commonly-owned, co-pending application Ser. No. 12/151,414, filed simultaneously herewith, entitled "HOLDER FOR INTEGRAL COMPACT FLUORESCENT LAMP WITH OUTER BULB" and Ser. No. 12/181,419, filed simultaneously herewith, entitled "ELECTRIC LAMP WITH INNER ASSEMBLY AND OUTER BULB AND METHOD FOR MANUFACTURING".

This disclosure relates to a lamp assembly, and more particularly to a compact fluorescent lamp (CFL) assembly of the type having an outer envelope or bulb that encloses the lamp and the associated electronics therein. The disclosure may find use in related environments so that particular aspects may have application, for example, as alternative ways to generally secure a CFL and associate electronics to a lamp base.

More recent developments in CFL assemblies include incorporation of an outer bulb or envelope about the CFL source. It is desired that the associated electronics or printed circuit board (PCB) that drives the CFL be incorporated into an integrated unit. That is, the electronics board is typically enclosed within a housing or shell that is axially positioned between the CFL source and a threaded base. In those designs where the CFL includes a series of interconnected, inverted U-shaped tubes, the overall diameter of the CFL source is generally narrow and thus the upper end of the shell that interconnects with a surrounding light transmissive envelope allows the CFL to be inserted through the open end of the outer envelope. Even then, the shell typically tapers or reduces to a neck or flare of a narrower dimension at an opposite end for connection with a mechanical and electrical connection and an associated socket that receives same. For example, it is common to have a threaded base, sometimes referred to as an Edison-style base, although pin type or plug-in type connections are also alternatively used.

In many instances, it is desired that a narrow end of the A-line-shaped outer envelope, i.e., the necked-down, smaller diameter portion region toward the base of the lamp, be sized smaller than the minimum lateral dimension of the CFL. By way of example, a helical CFL has first and second ends that extend generally longitudinally or parallel to a lamp axis, while an intermediate portion forms one or more helical turns in an effort to maximize a length of a discharge path between the first and second ends of the CFL. It often becomes necessary to cut the outer envelope generally along the maximum diameter portion and insert the CFL source into the cut envelope. Thereafter, the outer envelope is re-sealed along the cut line of the envelope to enclose the CFL.

It will be appreciated that minimizing the number of components and labor intensive handling of components inserted into the outer envelope is desirable for ease of manufacture. That is, once the outer envelope is cut in two pieces, it is desirable that the inner components be inserted and fixed in position in an inexpensive, repeatable, reliable manner.

Moreover, as noted above, where the CFL and other components cannot be inserted through the narrow end of the outer envelope, the separated portions of the outer envelope must be cut and re-sealed. The re-sealing process exposes the installed components to elevated temperatures. Accordingly, there is a need not only for locating the inner lamp components in the outer envelope and fixedly securing them within the envelope, but there is also a need to thermally protect the sensitive electronic components on the electronics board during the re-sealing process.

It will be further appreciated that the neck or flare portion of the outer envelope has surface irregularities. Thus, attempts to secure inner components to the remainder of the lamp assembly have focused on alternative structures and manners of attachment.

Accordingly, a need exists for fixing or securing an inner assembly that includes a CFL source to an outer envelope in an effective, repeatable, and inexpensive manner.

SUMMARY OF THE DISCLOSURE

An improved mechanism for fixing an inner assembly including a CFL source to an outer bulb is disclosed.

The lamp assembly includes an inner assembly having a compact fluorescent light (CFL) source, an electronics board, and a holder interconnecting the CFL source and the electronics board. An outer light transmissive envelope surrounds at least the light source. Fixing means is provided for interconnecting the inner assembly to the outer envelope.

The fixing means includes at least one of an adhesive, ratchet mechanism, or spring assembly.

The spring assembly includes a first portion connected to the inner assembly and a second portion connected to the outer envelope. In the preferred form, the spring second portion engages an end of the envelope.

Preferably, the spring is in tension and urges the inner assembly toward an end of the envelope.

The ratchet assembly includes a base plate dimensioned to overlie a first end of the envelope having an opening that receives a ratchet member therethrough that is connected to the inner assembly. A first toothed portion of the ratchet assembly selectively engages a second toothed portion associated with the base plate opening.

The lamp assembly may have application without an outer envelope where a CFL light source and electronics board are interconnected to one another via a holder. A base is configured for electrical and mechanical connection with an associated socket, and means for fixing the holder to the base is provided.

A primary benefit of this disclosure relates to a new fixing mechanism for securing the inner assembly to an outer bulb.

A fixing means eliminates the last degree of freedom of the inner assembly.

The fixing means adapts to a flare portion of the outer envelope that typically has irregularities from one glass envelope to another.

The fixing means provides both locating assistance and thermal protection for the electronics board during re-sealing of the glass envelope.

Still other features and benefits of the present disclosure will become apparent from reading and understanding the following detailed description.

BRIEF DESCRIPTION OF THE DRAWINGS

FIG. 9 is an enlarged elevational view of a ratchet member.

FIG. 10 is an elevational view of the ratchet member of FIG. 9 taken from the right-hand side of FIG. 9.

FIG. 11 is a cross-sectional view of the ratchet member of FIG. 10, taken generally along the lines 11-11 thereof.

FIG. 12 is a plan view of a base plate.

FIG. 13 is an elevational view of the base plate of FIG. 12.

FIG. 14 is a plan view of the underside of the base plate of FIG. 12.

FIG. 15 is a plan view of a ratchet cap.

FIG. 16 is a cross-sectional view taken generally along the lines 16-16 of FIG. 15.

FIG. 17 is a perspective view of a spring assembly for fixing the inner assembly to the outer envelope.

FIG. 18 is a plan view of the spring and outer envelope of FIG. 17.

FIG. 19 is an elevational view, shown partially in cross-section, of the spring assembly for securing the inner assembly to the outer envelope.

FIG. 20 is a perspective view of the spring member used in the embodiments of FIGS. 17-19.

DETAILED DESCRIPTION OF THE PREFERRED EMBODIMENTS

Figure 1:
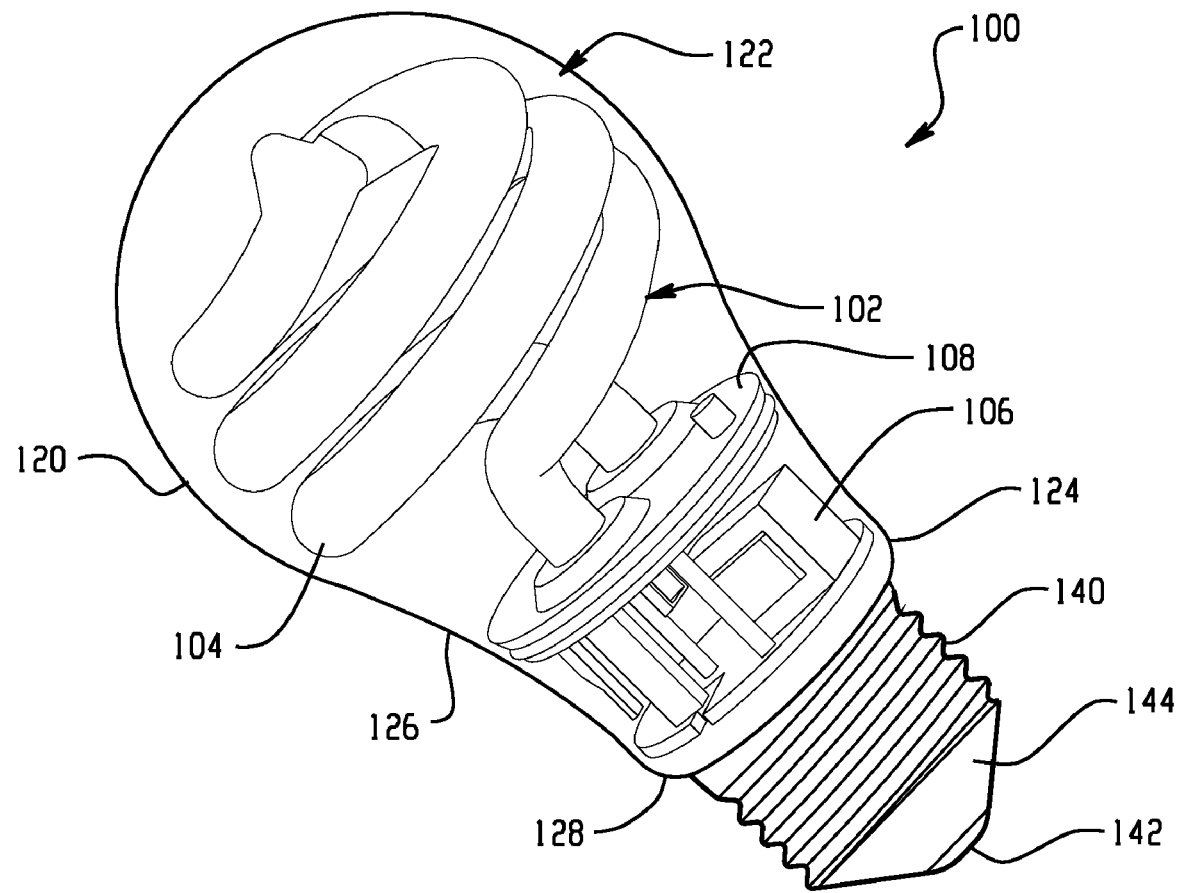
FIG. 1 is a perspective view of a lamp assembly that includes an inner assembly housed within an outer envelope.

Shown in FIG. 1 is a lamp assembly 100 that includes an inner assembly 102 having a light source 104 and electronics member or board, often referred to as a printed circuit board (PCB) 106, and a holder 108 that interconnects the light source and the electronics board so that the inner assembly can be handled as a sub-assembly. Enclosing the inner assembly is an outer envelope or bulb 120 which is preferably a light transmissive material such as glass that encloses an inner cavity dimensioned to receive the inner assembly therein. More particularly, the outer envelope adopts the general conformation of an A-line lamp that has an enlarged generally spherical portion 122 at one end and a flare or neck portion 124 at the other end interconnected with the spherical portion by tapering region 126. The outer envelope has a generally constant wall thickness that terminates in an opening at a first end 128 disposed adjacent a conventional electrically conductive base 140, shown here as a threaded Edison base 140. The threaded base is separated from an end contact 142 by an insulating material 144. The base, and particularly the contact 142 and threaded region 140 thereof, are received in an associated lamp socket (not shown) to establish electrical and mechanical connection of the lamp assembly. Of course, other lamp bases such as conventional plug-in type connections that establish mechanical and electrical connection between the lamp assembly and an associated electrical socket can be used without departing from the scope and intent of the present disclosure.

Figure 2:
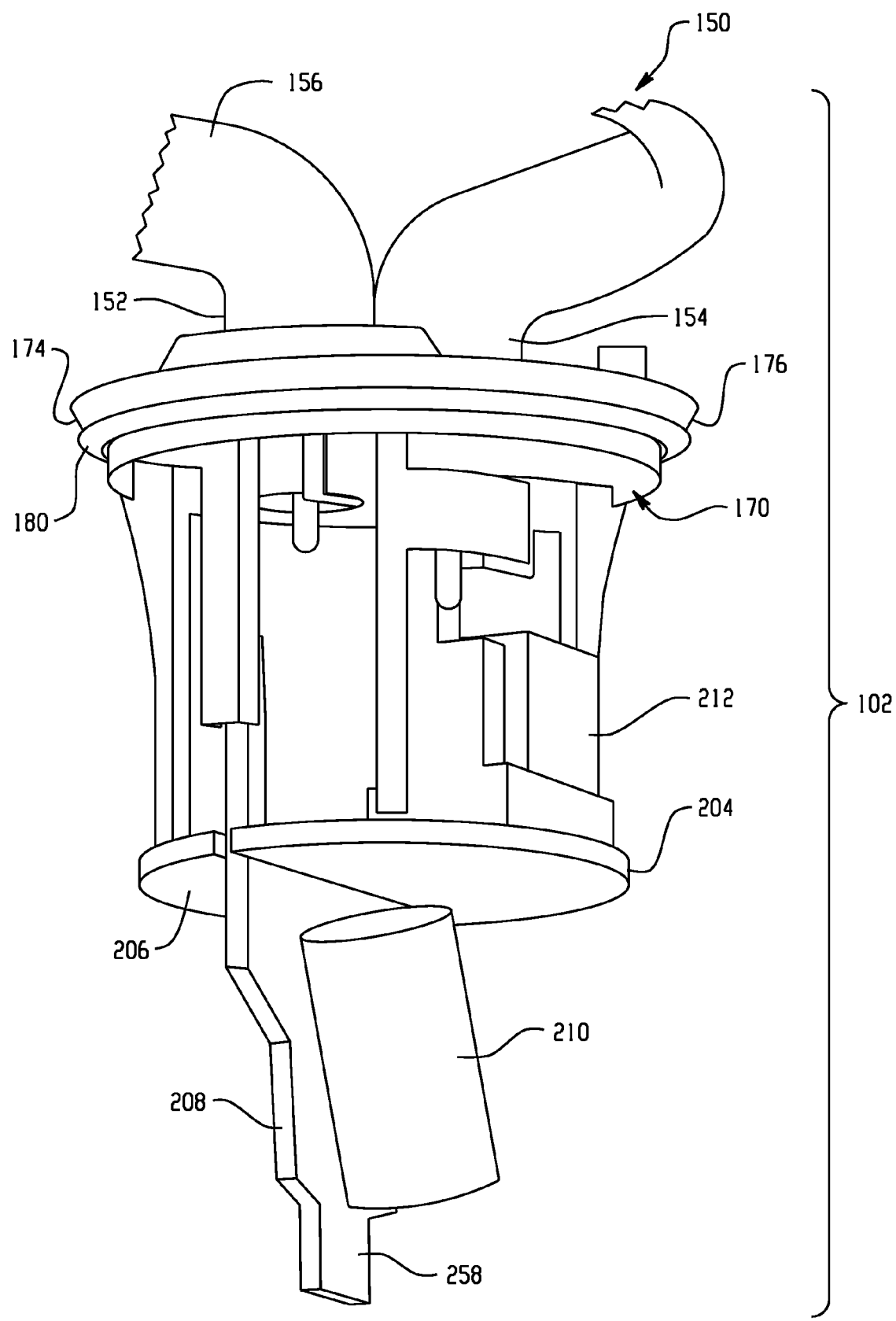
FIG. 2 is an enlarged perspective view of the inner assembly illustrating a lower portion of a CFL source received in a holder that is secured to an electronics board.

FIG. 2 more particularly illustrates the inner assembly 102, although the entire light source is not shown for ease of illustration. The light source as illustrated here is a compact fluorescent lamp (CFL) 150 that includes first and second ends or legs 152, 154 that extend generally parallel to one another and in a longitudinal direction that is generally parallel to a central lamp axis of the lamp assembly 100. These legs house the electrodes at opposite ends of an elongated discharge path that includes each leg and an intermediate discharge path which in this embodiment is a helical or spiral lamp arrangement 156.

The legs are received in the holder 108, which more particularly includes a platform 170 that includes first and second openings 172, 174 that closely receive legs 152, 154 of the CFL, respectively. The platform further includes an outer tapered perimeter 176 that substantially conforms to the tapered region 126 of the outer envelope. Disposed adjacent the tapered perimeter 176 is a shoulder 178 that receives a resilient ring or sealing O-ring 180 to slidably and sealingly engage with the inner surface of the tapering region 126 of the outer envelope. The tapered perimeter and O-ring provides for desired positioning and location of the inner assembly 102 within the outer envelope. Preferably, the holder is formed of a heat-resistant material such as plastic and has sufficient rigidity and strength to provide a stable mounting of the CFL within the outer envelope. Further, the holder includes a passage 182 (FIG. 4) that communicates between a first or upper side 184 and a second or lower side 186. The passage 182 is provided to supply pressurized fluid, such as air, during a re-sealing process of the outer envelope which will be more particularly described below.

Figure 3:
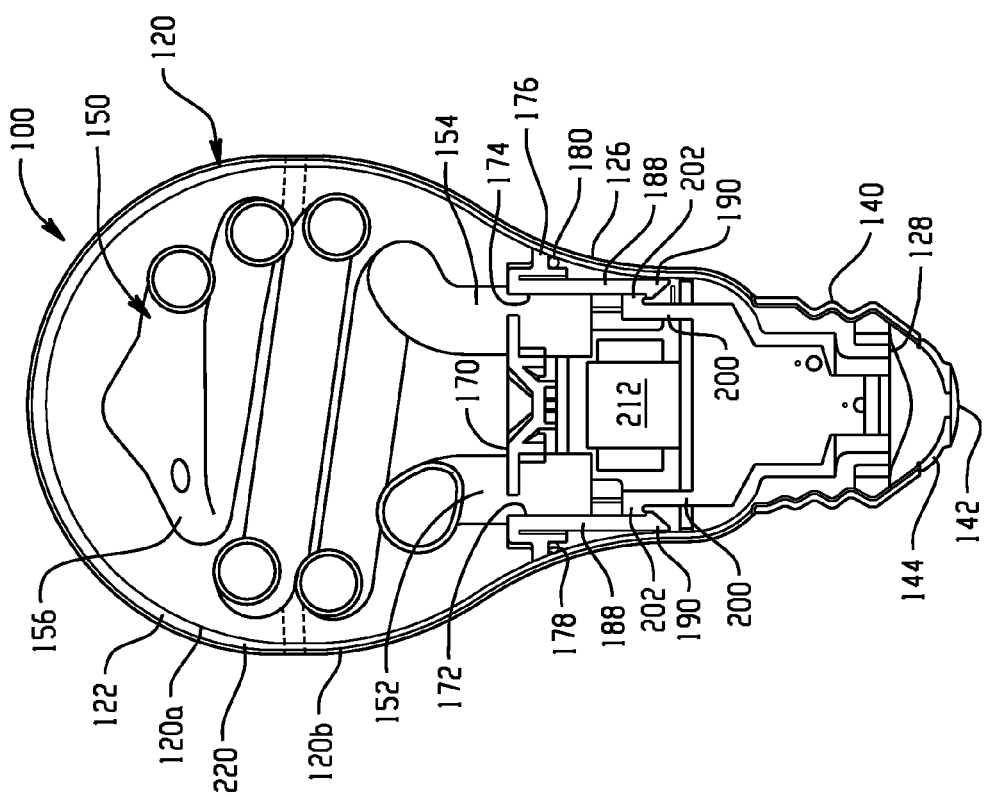
FIG. 3 is a longitudinal cross-section of the lamp assembly of FIG. 1.
Figure 6:
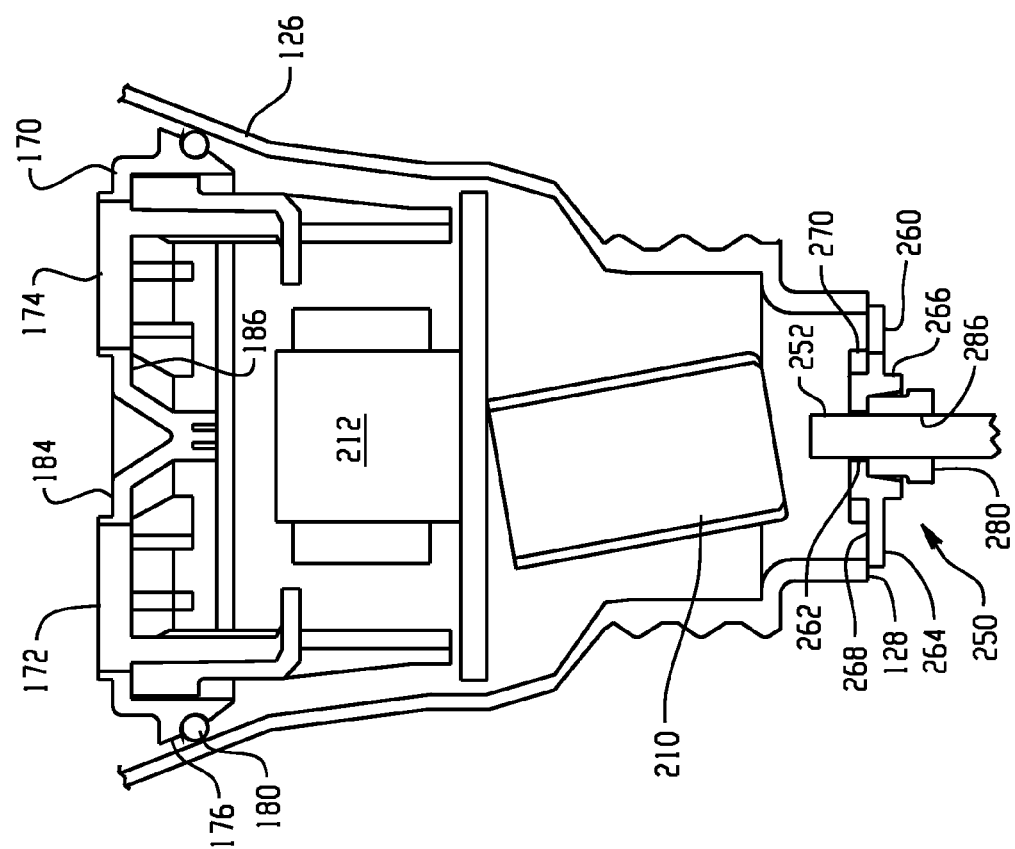
FIG. 6 is a view similar to FIG. 5, but rotated through ninety degrees (90°).
Figure 5:
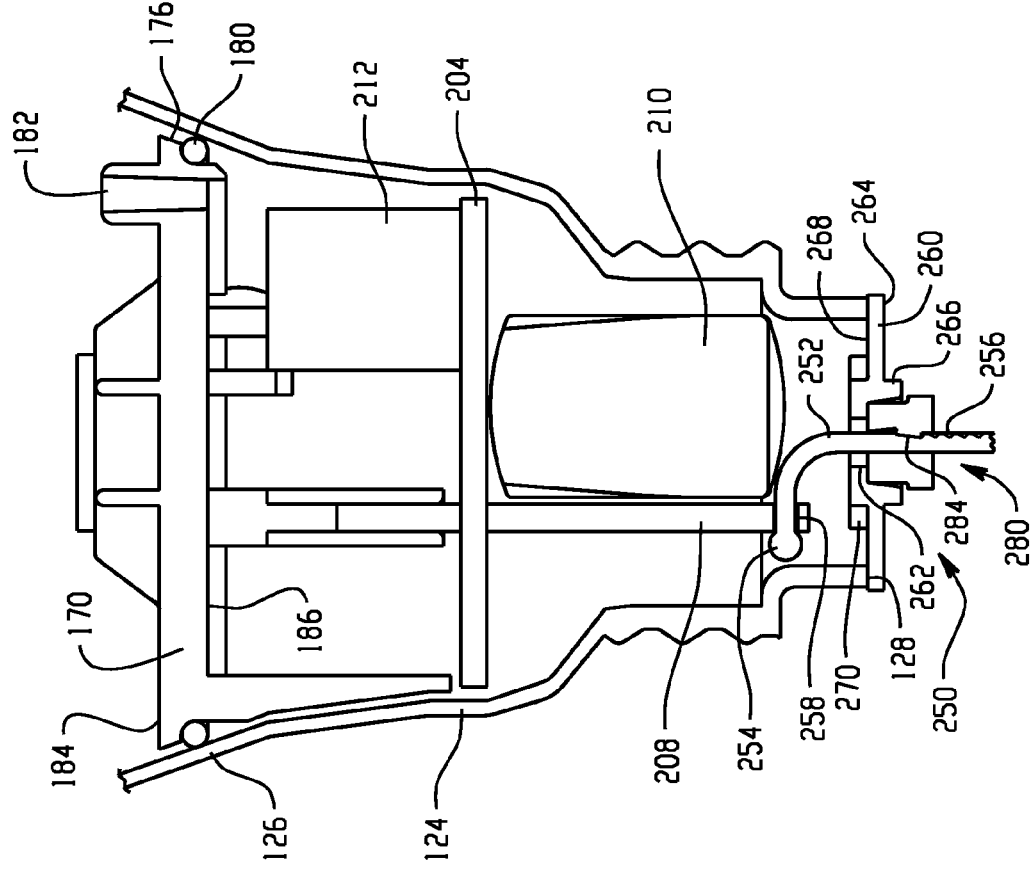
FIG. 5 is an enlarged cross-sectional view of a ratchet assembly for fixing the inner assembly to an outer envelope.
Figure 8:
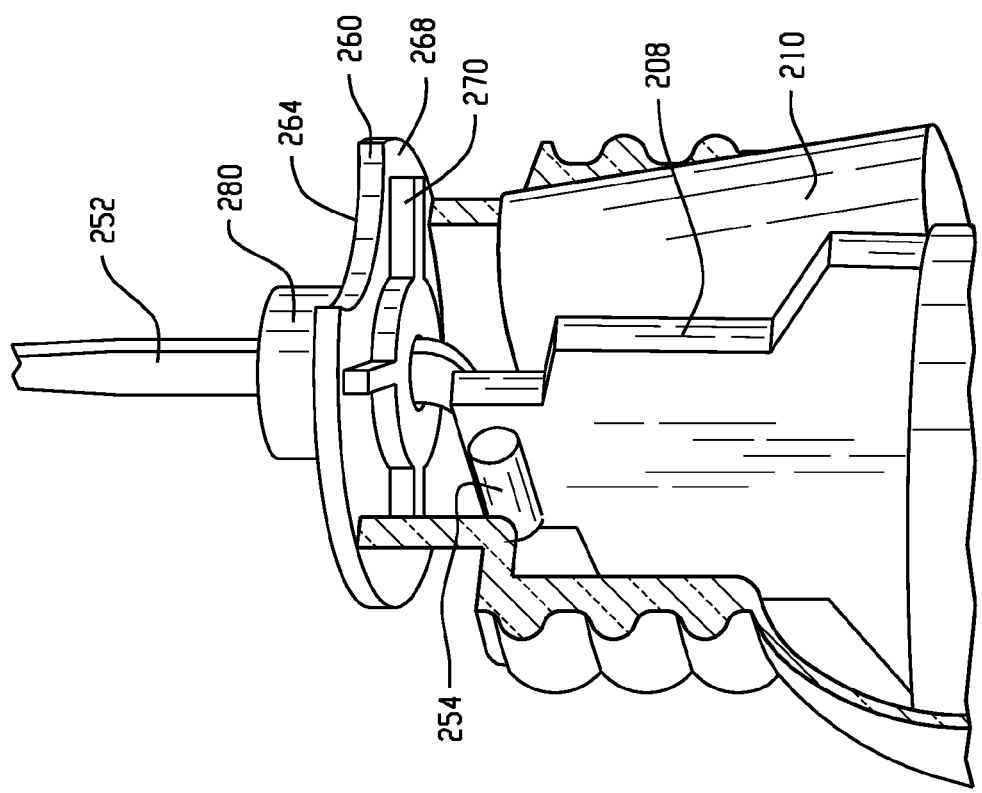
FIG. 8 is a perspective view in partial cross-section similar to FIG. 7, but rotated through approximately ninety degrees (90°).
Figure 7:
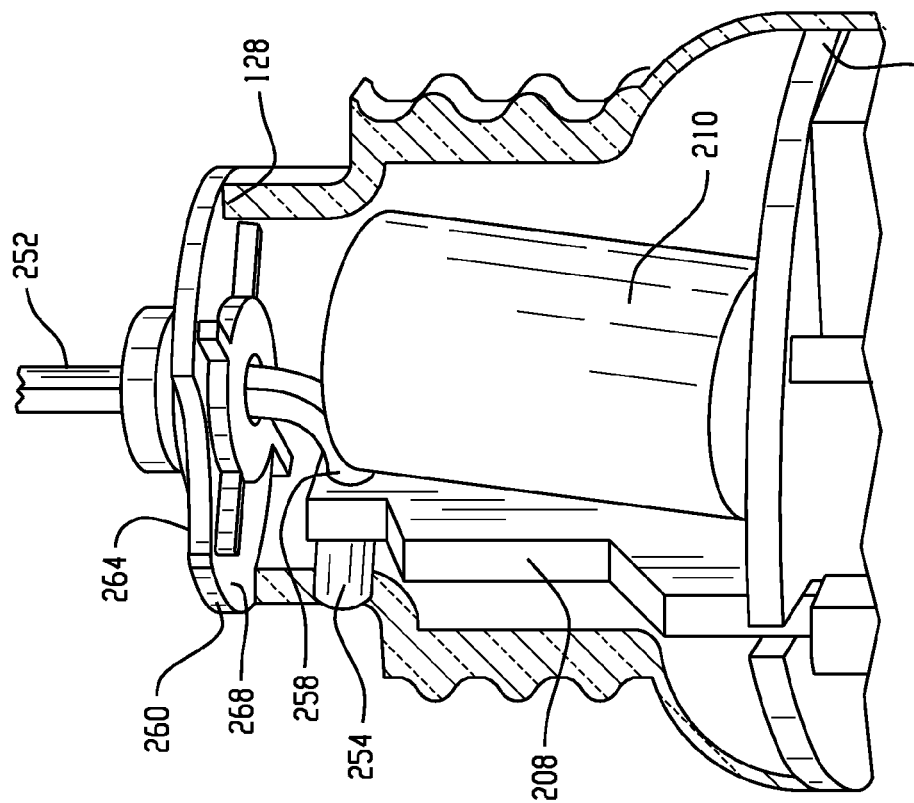
FIG. 7 is a perspective view of the lower portion of the lamp assembly illustrating the ratchet assembly for fixing the inner assembly to an outer envelope.
Figure 17:
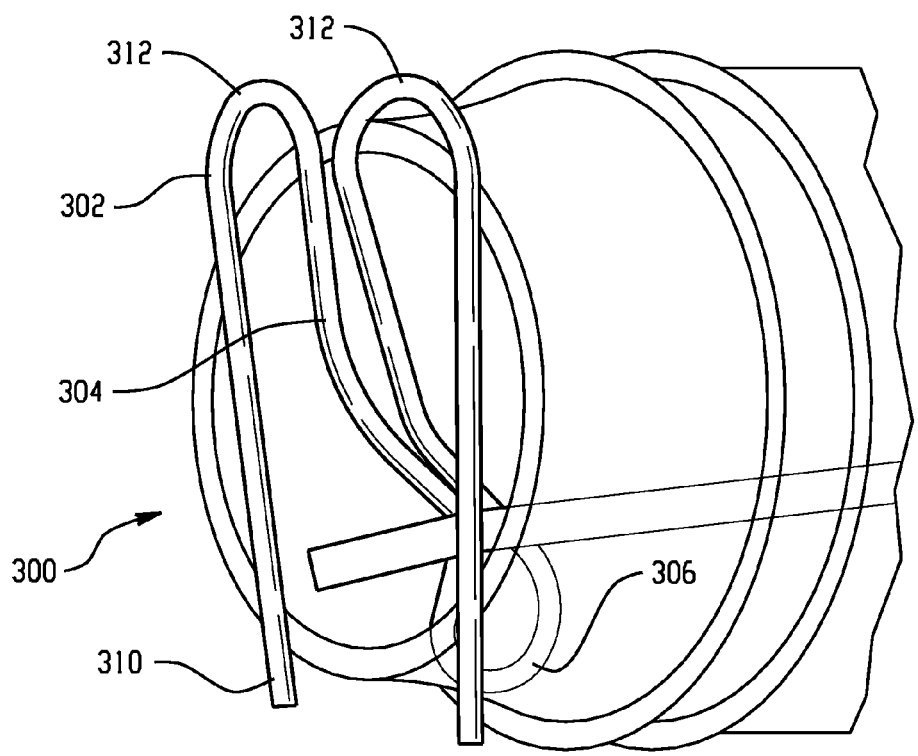
FIGS. 17 through 20 are views illustrating use of the ratchet member to fix the inner assembly to the outer envelope.
Figure 18:
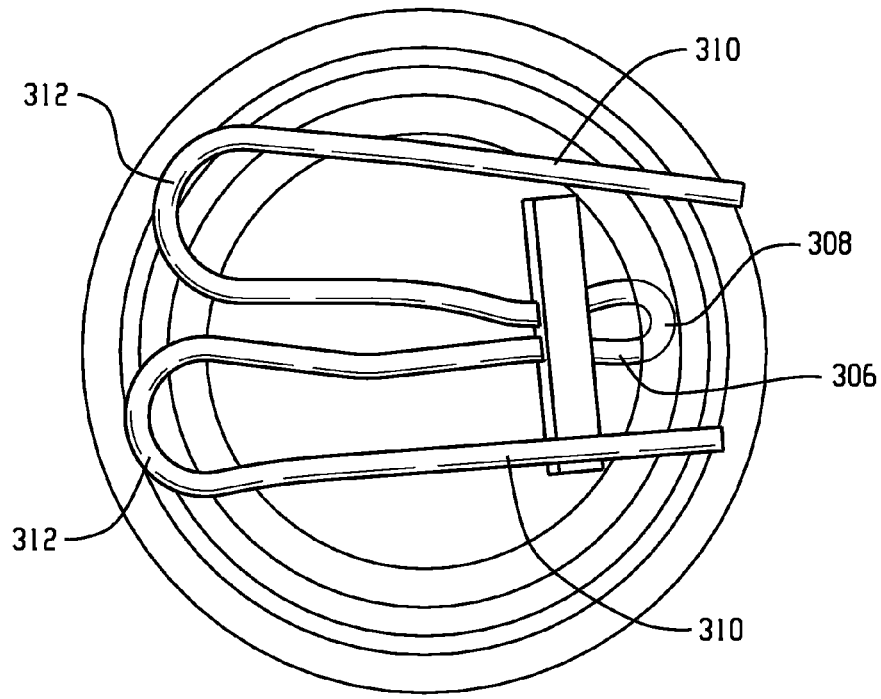
Figure 19:
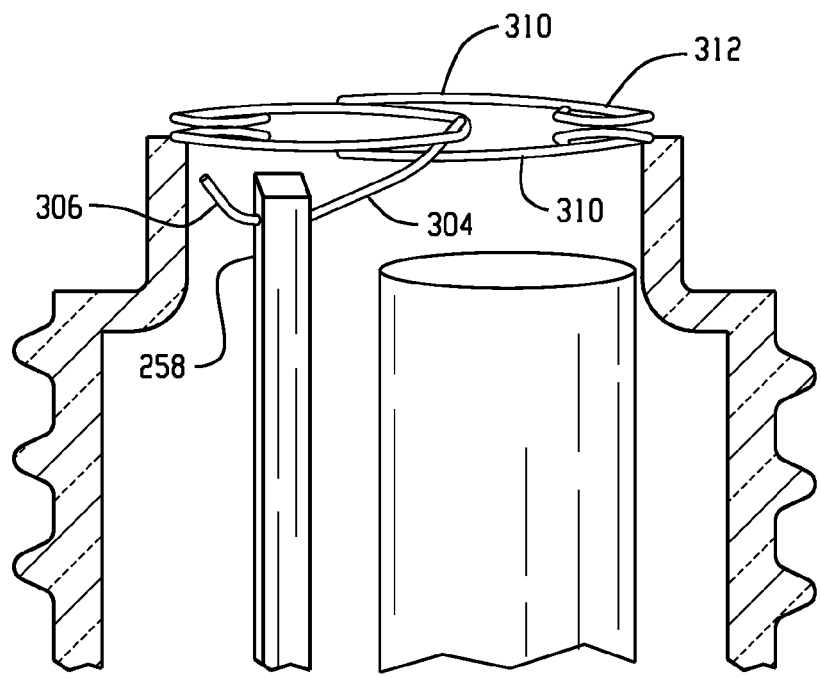

Extending from the second side 186 of the holder are circumferentially spaced legs 188 (FIG. 3). The legs preferably have retaining shoulders 190 dimensioned for snap-fit engagement with the electronics board 106 via legs 200 having similar retaining shoulders 202 on the electronics board that cooperate with the retaining shoulders 190. The electronics board also includes a disk or platform 204 that includes a slot 206 to receive a vertically extending portion of the PCB which carries various electrical components 210. It will be appreciated that the component is merely illustrative of one electrical component that may be disposed on the electronics board, and should not be intended to limit the construction. For example, other electrical components 212 may be disposed on an upper surface of the platform 204 to allow ease of connection with the legs 152, 154 of the CFL source.

Figure 4:
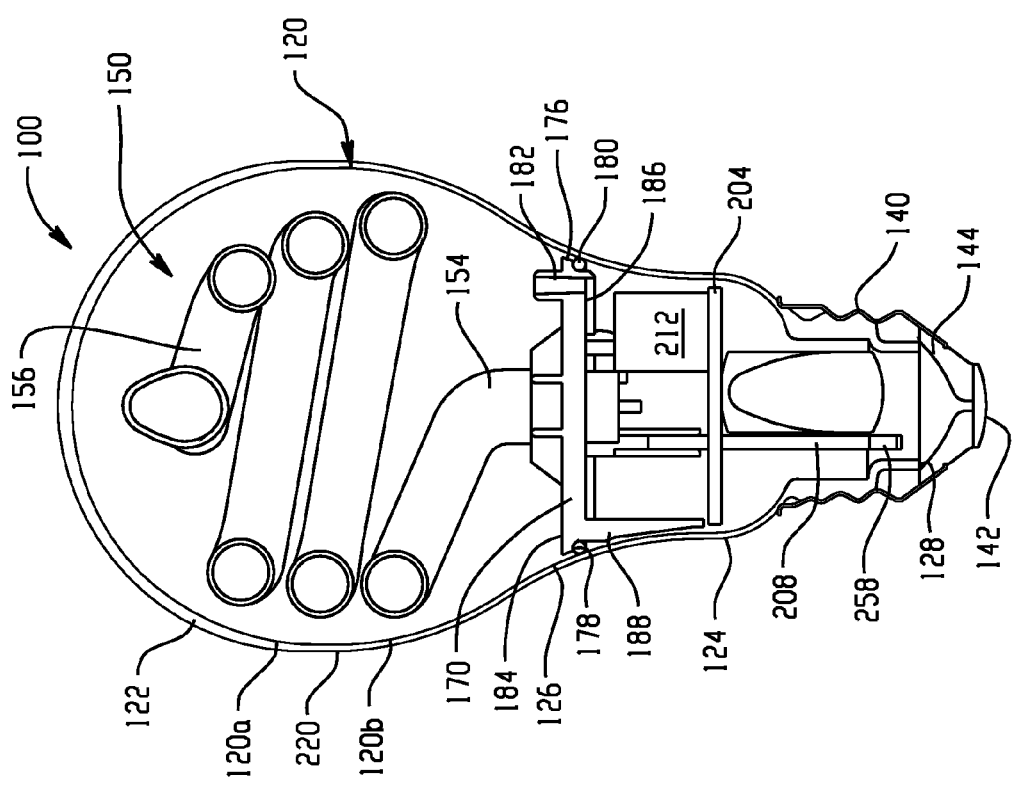
FIG. 4 is a cross-sectional view similar to FIG. 3, but rotated through ninety degrees (90°).

The inner assembly 102, as generally illustrated in FIG. 2, and as embodied into the lamp assembly as shown in FIGS. 3 and 4, may be pre-assembled as a sub-assembly. As is apparent from FIGS. 3 and 4, the diameter of the CFL source 150 is larger than the diameter or transverse dimension of the neck portion 124 of the outer envelope. In order to assemble the lamp, it becomes necessary to cut the outer envelope 120 into first and second portions 120a, 120b along separation or parting plane 220. Once separated, the inner assembly 102 is inserted by directing the electronics board end initially inward into the lower portion 120b of the outer envelope. Once the inner assembly is fixed or retained in secured relation in a manner to be described below, the outer envelope is re-sealed along the plane 220 to define a one-piece outer envelope again.

As a part of the outer envelope arrangement, it becomes necessary to secure or fix the inner assembly thereto. This disclosure describes three preferred ways to accomplish fixing of the inner assembly to the outer envelope. With continued reference to FIGS. 1-4, attention is directed to FIGS. 5-8 which illustrate a first preferred arrangement generally referred to as a ratchet assembly or ratchet mechanism 250. The ratchet assembly includes a first ratchet member 252, which in the preferred arrangement is a generally elongated, generally L-shaped component having an enlarged head 254 at one end and a toothed portion 256 extending along the elongated leg thereof. The enlarged head 254 (FIGS. 9-11) has a dimension greater than opening 258 provided in a vertically extending portion 208 of the electronics board. In this manner, the L-shaped ratchet member 252 is extended through the opening until the enlarged head 254 abuts adjacent the opening 258. This provides a secure connection between the first ratchet member 252 and the inner assembly. The elongated leg of the first ratchet member is then received through a support member 260 and particularly, a central opening 262 therein (FIGS. 5-8 and 12-14). The support member has a maximum dimension adapted to abuttingly engage against the first, lower end 128 of the outer envelope. A first surface 264 includes a central boss 266, while the opposite face 268 includes a locating means such as a cruciform-shaped arrangement 270 that is dimensioned for receipt within the inner diameter of the first end of the outer envelope. In addition to the ratchet member 252 and the support member 260, the ratchet assembly 250 further includes a toothed insert 280 that includes an irregular perimeter 282, such as a polygon shape, that conforms to the opening 262 in the support member 260. The insert 280 further includes a toothed portion 284 that extends at least partially into passage 286 for selective cooperative engagement with the toothed portion 256 of the ratchet member 252 (FIGS. 5-8 and 15-16).

FIGS. 17-20 illustrate a second mechanism, hereinafter referred to as a "spring assembly", for fixing the inner assembly to the outer envelope. More particularly, the opening 258 in the vertical portion of the electronics board is advantageously used to grab or grip the inner assembly and urge the inner assembly inwardly into the outer envelope. The spring mechanism 300 is configured so that spring 302 is preferably a single-piece construction that has a first portion that engages the inner assembly, and a second portion that engages the outer envelope and imparts a spring force or tension on fixing the inner assembly to the outer envelope. That is, a first leg 304 of the spring has an enlarged loop 306 with a necked-down region 308 received through the opening 258 in the electronics board. Thus, the loop 306 is oriented for insertion through the opening in the electronics board, and the entire spring then rotated through ninety degrees (90°) so that the loop prevents inadvertent removal of the spring from the electronics board. The loop may also have a slightly upturned configuration (FIG. 19) for further retention capabilities as the inner assembly is inserted or advanced toward the neck of the outer envelope. As will be appreciated, the overall lateral dimension of the spring is preferably maintained less than the opening in the first end 128 of the outer envelope. In this manner, the inner assembly with the spring attached as described above can be fed toward the narrowed opening in end 128. The second portion or second leg 310 of the spring is actually formed as separate legs for symmetry reasons and for evenly distributing the forces imposed on the inner assembly. Thus, reverse loop portions 312 terminate in elongated legs 310. As is apparent in FIGS. 17-19, the second legs are dimensioned to extend across the entire opening at the first end 128 of the outer envelope when the spring is positioned in a generally perpendicular relation to the lamp axis or, stated another way, when the second legs are generally disposed in plane or in abutting engagement with the first end of the outer envelope. The reverse loop portions 312 extend beyond the periphery of the first end of the envelope, while the linear leg portions terminate generally diametrically opposite and also beyond the perimeter of the first end of the outer envelope. In this manner, the first leg 304 of the spring has a natural tendency to seek to be in plane with the second leg portions 310. This provides the tension or inward pulling force on the inner assembly and seats the O-ring and tapered portion of the holder against the inner surface of the outer envelope.

Figure 20:
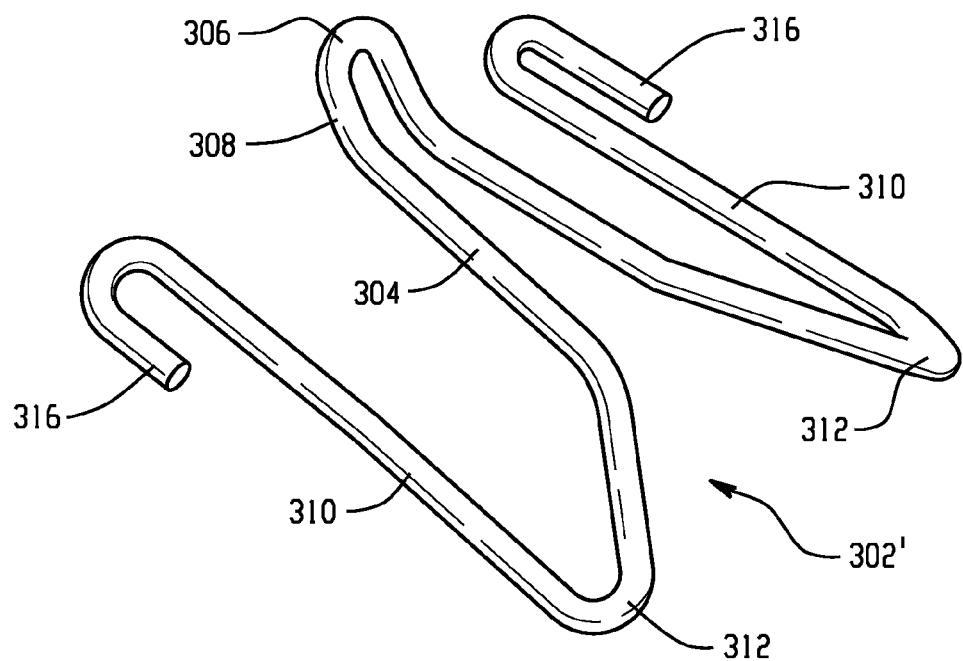

FIG. 20 demonstrates that spring 302' can adopt a slightly different variation where the linear leg portions 310 include curved ends 316. Otherwise, the spring 302' of FIG. 20 is substantially identical in structure and function to that shown relative to FIGS. 17-19.

A third manner of fixing the inner assembly to the outer envelope is also contemplated. Specifically, this arrangement provides for a glue or an adhesive solution to fix the inner assembly to the outer envelope. Preferably, a two-component silicon or hot-melt adhesive is used. The hot-melt adhesive is placed in a cup and base of the outer envelope at the same time and a twisting action undertaken between the two so that at a temperature of approximately 200° C., the adhesive is spread about the perimeter of the electronics board. Once the adhesive cools, the adhesive becomes solid and maintains the tension between the electronics board and the base portion of the outer envelope. If desired, the hook or wire can provide a temporary pulling force on the inner assembly to hold the inner assembly in a desired location until the adhesive cures.

It is also contemplated that these fixing features be potentially used with the lamp base and without an outer envelope. Thus, any of the fixing methodologies described above, that is, the ratchet mechanism, the spring mechanism, or the adhesive arrangement by which the inner assembly is fixed to the outer envelope may find application in securing the CFL source, holder, and electronics board to the remainder of a lamp base.

In summary, a new lamp assembly includes a special inner structure that requires a new fixing mechanism for the inner assembly to the outer bulb or envelope. Preferably, fixing is accomplished via the electronics board. In the torsion spring arrangement, the spring is attached to the electronics boards of the ballast assembly through a hole, and another portion of the spring aligns to a base circumference of the outer envelope.

In the ratchet arrangement, the base plate aligns to a base circumference of the outer envelope. The base plate and the electronics board are then attached to each other by an L-shaped ratchet ribbon/rod. The ratchet base may be part of the plate or a separate element.

In the adhesive arrangement, the glue/adhesive filled base is attached to the outer envelope where the electronics board is partially embedded in the glue. As a result of this fixing of the inner assembly to the outer envelope, a last degree of freedom of the inner assembly is fixed. Testing shows that a pull force of 30 to 100 Newtons is obtained and less than 10 Newtons is likely needed.

The disclosure has been described with reference to the preferred embodiments. Obviously, modifications and alterations will occur to others upon reading and understanding the preceding detailed description. It is intended that the invention be construed as including all such modifications and alterations.

What is claimed is:

1. A lamp assembly comprising: an inner assembly including (i) a compact fluorescent light source, (ii) an electronics board and (iii) a holder interconnecting the CFL source and the electronics board; an outer, light transmissive envelope surrounding the light source; a resilient member received between the holder and the envelope; and a ratchet assembly for fixing the inner assembly to the outer envelope, wherein the ratchet assembly includes a ratchet member connected to the inner assembly and a base plate connected to the envelope for selectively urging the inner assembly towards an envelope end in tensile relation, wherein the base plate is dimensioned to overlie the envelope end and includes a base plate opening that receives the ratchet member there through, wherein the ratchet member includes a first toothed portion of the ratchet assembly that selectively engages a second toothed portion associated with the base plate opening, and wherein the electronics board includes an opening that receives the ratchet member.

2. The lamp assembly of claim 1 herein the ratchet member is connected to the electronics board of the inner assembly.

3. The lamp assembly of claim 1 wherein the ratchet member has an enlarged head at a first end and the first toothed portion along a second end.

4. The lamp assembly of claim 3 wherein the ratchet member extends through the opening in the electronics board and the enlarged head abuts the electronics board adjacent the opening.

5. The lamp assembly of claim 1 wherein the base plate includes a support member adapted to abuttingly engage against the envelope end.

6. The lamp assembly of claim 5 wherein the ratchet member is received through a central opening within the support member.

7. The lamp assembly of claim 6 wherein the base plate further includes an insert provided at the central opening within the support member, the insert including the second toothed portion that selectively cooperates with the first toothed portion of the ratchet member.

* * * * *